(12) United States Patent
Aiouaz et al.

(10) Patent No.: US 8,082,556 B1
(45) Date of Patent: Dec. 20, 2011

(54) EXTENDING AN RFID READER API

(75) Inventors: Ali Aiouaz, Mission Viejo, CA (US);
Christopher S. Delaney, Irvine, CA (US)

(73) Assignee: Impinj, Inc., Seattle, WA (US)

( * ) Notice: Subject to any disclaimer, the term of this patent is extended or adjusted under 35 U.S.C. 154(b) by 1034 days.

(21) Appl. No.: 11/959,592

(22) Filed: Dec. 19, 2007

Related U.S. Application Data

(60) Provisional application No. 60/932,561, filed on May 30, 2007.

(51) Int. Cl.
*G06F 3/00* (2006.01)
*G06F 9/54* (2006.01)
*G06F 13/42* (2006.01)
(52) U.S. Cl. ...... 719/328; 340/1.1; 340/12.5; 340/13.26
(58) Field of Classification Search .................. None
See application file for complete search history.

(56) References Cited

U.S. PATENT DOCUMENTS 7,659,819 B2 * 2/2010 Loving .................... 340/10.1

OTHER PUBLICATIONS

Lee et al., "Software Architecture for a Multi-Protocol RFID Reader on Mobile Devices", Feb., 2006, ICACT, pp. 1033-1036.*
Cheong et al, "REMS and RBPTS: ALE-compliant RFID Middleware Software Platform", Feb. 2006, ICACT, pp. 699-704.*
Son et al., "Design and Implementation of mobile RFID technology in the CDMA networks", 2005, IEEE, pp. 1-8.*

* cited by examiner

*Primary Examiner* — Qing Wu
(74) *Attorney, Agent, or Firm* — Turk IP Law, LLC

(57) ABSTRACT

The present disclosure provides a Radio Frequency Identification (RFID) reader software structure and method. A functionality of a reader engine is extended, enabling it to communicate via an extended standard Application Programming Interface (API) with an application software. The extended functionality supports a Partner Service Module that resides in the reader, thus allowing at least one of its Partner Software Functions to communicate with the application software over a single connection.

33 Claims, 14 Drawing Sheets

RFID READER WITH EXTENDED API

*RFID READER SYSTEM CONFIGURATION WITH OPTIONAL LOCAL AND REMOTE COMPONENTS*

RFID READER WITH EXTENDABLE API

*RFID READER WITH EXTENDED API*

RFID READER WITH EXTENDED API

EXTENDED READER ENGINE MESSAGE ROUTING

*METHOD OF EXTENDING A READER'S API FUNCTIONALITY BY AUTO-DISCOVERY OF A PSM*

METHOD OF EXTENDING A READER'S API FUNCTIONALITY
BY DYNAMIC REGISTRATION OF A PSM

REGISTER NEW PSM

EXTENDING AN RFID READER API

CROSS REFERENCE TO RELATED APPLICATIONS

This patent application claims priority from U.S. Provisional Patent Application No. 60/932,561 filed on May 30, 2007, the disclosure of which is hereby incorporated by reference for all purposes.

FIELD OF THE INVENTION

The present description addresses the field of Radio Frequency IDentification (RFID) systems, and more specifically the RFID reader software structure that supports a partner software module (PSM) that is resident of the reader for communicating with an external application software.

BACKGROUND

Radio Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

RFID readers are generally controlled by software, which often uses an Application Programming Interface (API). Problems arise when a partner develops a new Partner Software Function (PSF) for a custom feature, function or business process on the RFID reader. Development of such a new PSF is typically costly, largely due to the need for its own API over the network.

BRIEF SUMMARY

The present disclosure provides Radio Frequency IDentification (RFID) reader software and methods. In some embodiments, a functionality of a reader engine becomes extended, enabling it to communicate via an extended standard Application Programming Interface (API) with an application software. The extended functionality supports a Partner Service Module that resides in the reader, thus allowing at least one of its Partner Software Functions to communicate with the application software over a single connection.

The invention offers advantages over existing proprietary RFID reader API and custom API solutions by providing a unified, extendable standard API solution.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which.

DETAILED DESCRIPTION

Figure 1:
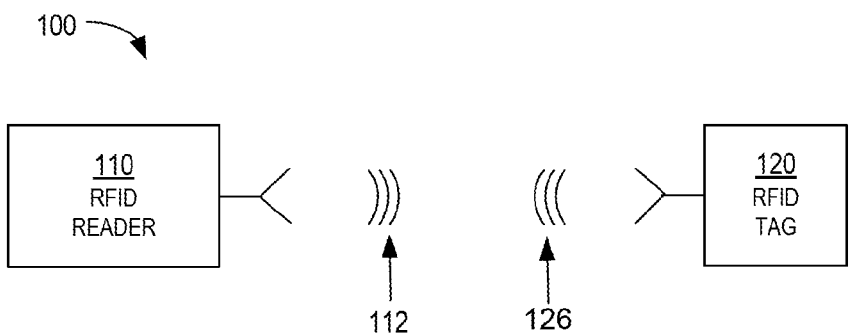
FIG. 1 is a block diagram of components of a Radio Frequency IDentification (RFID) system.

The present invention is now described in more detail. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention might be modified in numerous ways. Among other things, the present invention may be embodied as devices, methods, software, and so on. Accordingly, the present invention may take the form of an entirely hardware embodiment, an entirely software embodiment, an entirely firmware embodiment, or an embodiment combining aspects of the above. This description is, therefore, not to be taken in a limiting sense.

The following definitions are provided as they are typically (but not exclusively) used in the RFID reader environment, implementing the various adaptive aspects of the present invention.

"Application Programming Interface (API)" is a source code interface that an operating system, or library, or communication port provides to facilitate communications between hosts or between processes, or between software modules.

"Partner Software Module (PSM)" is a program that implements a partner's software function, which delivers one or more additional functionalities for an RFID reader. One such functionality could be called a Partner Software Function (PSF).

"Private Enterprise Number" (PEN) identifies partner service module (PSM), it is defined by the Internet Assigned Numbers Authority (IANA).

"Reader Engine" is a set of functions, definitions that tracks and controls software modules and other principal objects, drives I/O, maintains timers, and conveys messages between software modules of functions. It also abstract operating system dependent commands, and provides a set of standardized services to manipulate various settings of an RFID reader.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e. having its own power source. Where tag 120 is a passive tag, it is powered from wave 112.

Figure 2:
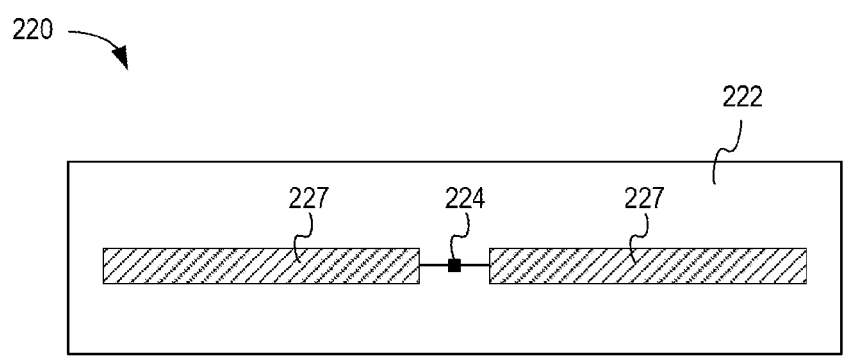
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
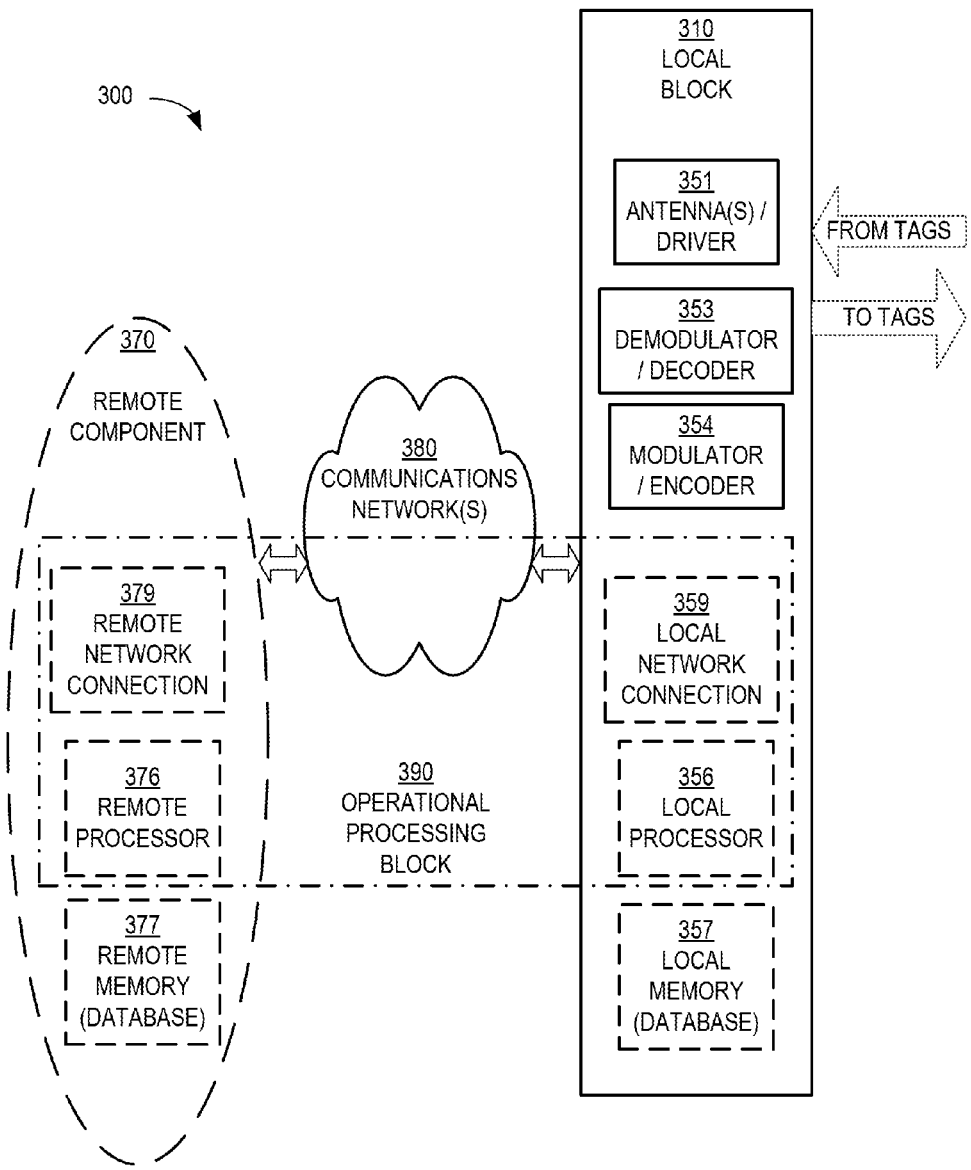
FIG. 3 is a block diagram of a whole RFID reader system according to embodiments.

FIG. 3 is a block diagram of a whole RFID reader system 300 according to embodiments. System 300 includes a local block 310, and optionally remote components 370. Local block 310 and remote components 370 can be implemented in any number of ways. It will be recognized that reader 110 of FIG. 1 is the same as local block 310, if remote components 370 are not provided. Alternately, reader 110 can be implemented instead by system 300, of which only the local block 310 is shown in FIG. 1.

Local block 310 is responsible for communicating with the tags. Local block 310 includes a block 351 of an antenna and a driver of the antenna for communicating with the tags. Some readers, like that shown in local block 310, contain a single antenna and driver. Some readers contain multiple antennas and drivers and a method to switch signals among them, including sometimes using different antennas for transmitting and for receiving. Moreover, some readers contain multiple antennas and drivers that can operate simultaneously. A demodulator/decoder block 353 demodulates and decodes backscattered waves received from the tags via antenna block 351. Modulator/encoder block 354 encodes and modulates an RF wave that is to be transmitted to the tags via antenna block 351.

Local block 310 additionally includes an optional local processor 356. Processor 356 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 353, the encoding function in block 354, or both, may be performed instead by processor 356.

Local block 310 additionally includes an optional local memory 357. Memory 357 may be implemented in any number of ways known in the art. Such ways include, by way of examples and not of limitation, nonvolatile memories (NVM), read-only memories (ROM), random access memories (RAM), any combination of one or more of these, and so on. Memory 357, if provided, can include programs for processor 356 to run, if provided. One such program may include one or more PSMs.

In some embodiments, memory 357 stores data read from tags, or data to be written to tags, such as Electronic Product Codes (EPCs), Tag Identifiers (TIDs) and other data. Memory 357 can also include reference data that is to be compared to the EPC codes, instructions and/or rules for how to encode commands for the tags, modes for controlling antenna 351, and so on. In some of these embodiments, local memory 357 is provided as a database.

Some components of local block 310 typically treat the data as analog, such as the antenna / driver block 351. Other components such as memory 357 typically treat the data as digital. At some point, there is a conversion between analog and digital. Based on where this conversion occurs, a whole reader may be characterized as "analog" or "digital", but most readers contain a mix of analog and digital functionality.

If remote components 370 are indeed provided, they are coupled to local block 310 via an electronic communications network 380. Network 380 can be a Local Area Network (LAN), a Metropolitan Area Network (MAN), a Wide Area Network (WAN), a network of networks such as the internet, or a mere local communication link, such as a USB, PCI, and so on. In turn, local block 310 then includes a local network connection 359 for communicating with network 380.

There can be one or more remote component(s) 370. If more than one, they can be located at the same location, or in different locations. They can access each other and local block 310 via network 380, or via other similar networks, and so on. Accordingly, remote component(s) 370 can use respective remote network connections. Only one such remote network connection 379 is shown, which is similar to local network connection 359, etc.

Remote component(s) 370 can also include a remote processor 376. Processor 376 can be made in any way known in the art, such as was described with reference to local processor 356.

Remote component(s) 370 can also include a remote memory 377. Memory 377 can be made in any way known in the art, such as was described with reference to local memory 357. Memory 377 may include a local database, and a different database of a Standards Organization, such as one that can reference EPCs.

Of the above-described elements, it is advantageous to consider a combination of these components, designated as operational processing block 390. Block 390 includes those that are provided of the following: local processor 356, remote processor 376, local network connection 359, remote network connection 379, and by extension an applicable portion of network 380, that links connection 359 with connection 379. The portion can be dynamically changeable, etc. In addition, block 390 can receive and decode RF waves received via antenna 351, and cause antenna 351 to transmit RF waves according to what it has processed.

Block 390 includes either local processor 356, or remote processor 376, or both. If both are provided, remote processor 376 can be made such that it operates in a way complementary with that of local processor 356. In fact, the two can cooperate. It will be appreciated that block 390, as defined this way, is in communication with both local memory 357 and remote memory 377, if both are present.

Accordingly, block 390 is location agnostic, in that its functions can be implemented either by local processor 356, or by remote processor 376, or by a combination of both. Some of these functions are preferably implemented by local processor 356, and some by remote processor 376. Block 390 accesses local memory 357, or remote memory 377, or both for storing and/or retrieving data.

Reader system 300 operates by block 390 generating communications for RFID tags. These communications are ultimately transmitted by antenna block 351, with modulator/encoder block 354 encoding and modulating the information on an RF wave. Then data is received from the tags via antenna block 351, demodulated and decoded by demodulator/decoder block 353, and processed by processing block 390.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described.

Figure 4:
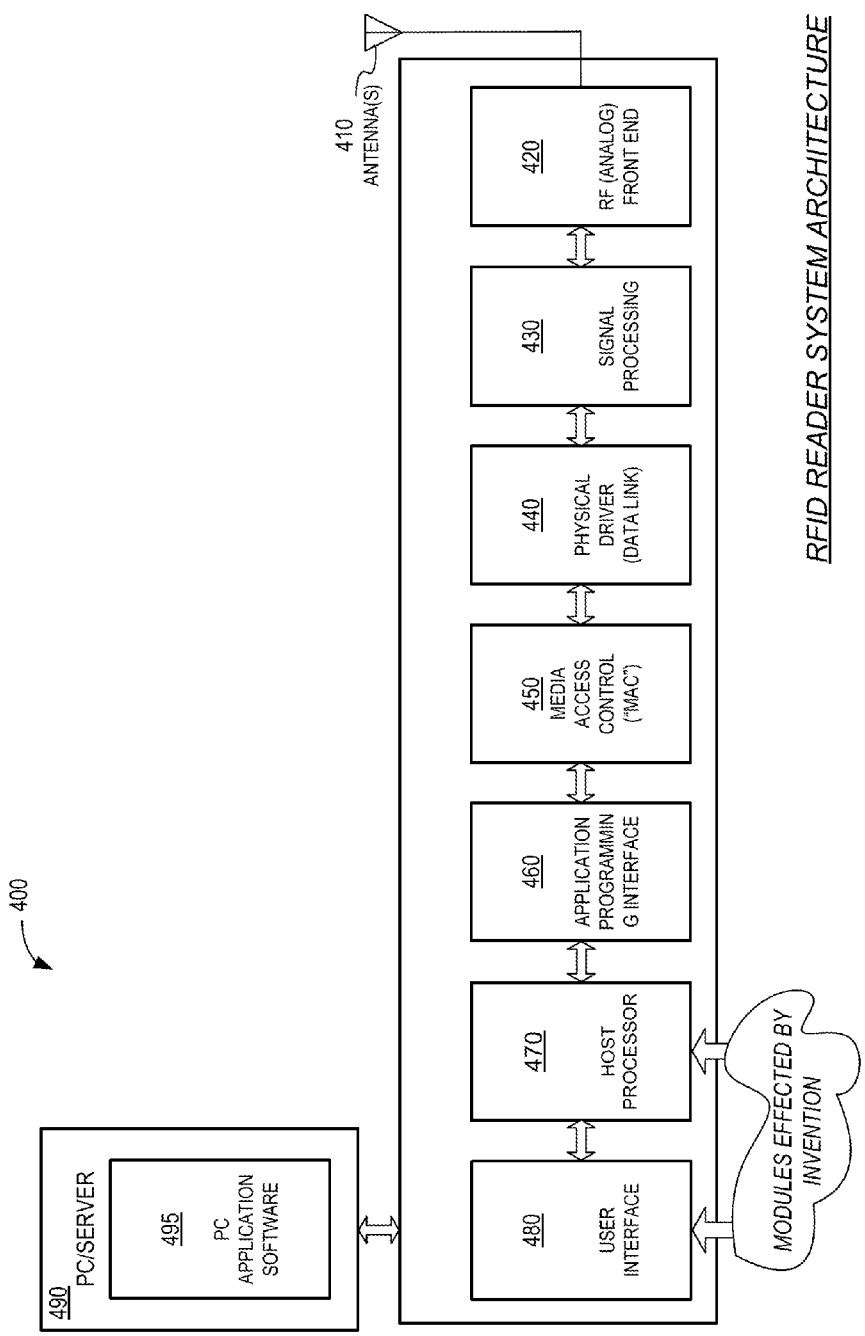
FIG. 4 is a conceptual diagram of the RFID reader system architecture according to embodiments.

FIG. 4 is a block diagram illustrating an overall architecture of an RFID reader system 400 according to embodiments. It will be appreciated that system 400 is considered subdivided into modules or components. Each of these modules may be implemented by itself, or in combination with others. It will be recognized that some aspects are parallel with those of FIG. 3. In addition, some of them may be present more than once.

RFID reader system 400 includes one or more antennas 410, and an RF Front End 420, for interfacing with antenna(s) 410. These can be made as described above. In addition, Front End 420 typically includes analog components.

System 400 also includes a Signal Processing module 430. In this embodiment, module 430 exchanges waveforms with Front End 420, such as I and Q waveform pairs. In some embodiments, signal processing module 430 is implemented by itself in an FPGA.

System 400 also includes a Physical Driver module 440, which is also known as Data Link. In this embodiment, module 440 exchanges bits with module 430. Data Link 440 can be the stage associated with framing of data. In one embodiment, module 440 is implemented by a Digital Signal Processor.

System 400 additionally includes a Media Access Control module 450, which is also known as MAC layer. In this embodiment, module 450 exchanges packets of bits with module 440. MAC layer 450 can be the stage for making decisions for sharing the medium of wireless communication, which in this case is the air interface. Sharing can be between reader system 400 and tags, or between system 400 with another reader, or between tags, or a combination. In one embodiment, module 450 is implemented by a Digital Signal Processor. Module 450 may include a lower-level functionality and a higher-level functionality, and so on.

System 400 moreover includes an Application Programming Interface module 460, which is also known as API, Modem API, and MAPI. In some embodiments, module 460 is itself an interface for a user.

All of these functionalities can be supported by one or more processors. One of these processors can be considered a host processor 470. Host processor 470 processor 470 exchanges signals with MAC layer 450 via module 460. In some embodiments, host processor 470 is not considered as a separate module, but one that includes some of the above-mentioned modules of system 400. A user interface 480 is typically coupled to processor 470.

Host processor 470 can include other software modules for system 400, for example Partner Service Modules (PSM). In some embodiments, elements of module 460 may be distributed between processor 470 and MAC layer 450.

A user interface 480 may be coupled to API 460. User interface 480 can be manual, automatic, or both. It can be supported by a separate processor than the above-mentioned processor, or implemented on it.

System 400 and communicate with external application software 495 hosted on PC/Servers 490 via an extended standard API.

It will be observed that the modules of system 400 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 410 as signals, which are in turn processed successively by the various modules in the chain. Processing can terminate in any one of the modules. In a transmitting mode, initiation can be in any one of these modules. That, which is to be transmitted becomes ultimately signals for antenna(s) 410 to transmit as wireless waves.

The architecture of system 400 is presented for purposes of explanation, and not of limitation. Its particular subdivision into modules need not be followed for creating embodiments according to the invention. Furthermore, the features of the invention can be performed either within a single one of the modules, or by a combination of them.

An economy is achieved in the present document in that a single set of flowcharts is used to describe methods in and of themselves, along with operations of hardware and/or software and/or firmware. This is regardless of how each element is implemented.

Figure 5:
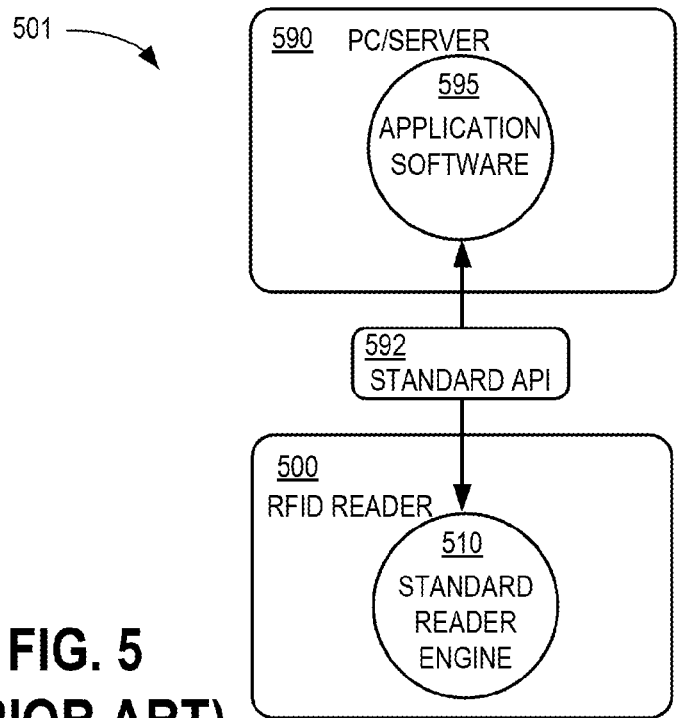
FIG. 5 is a block diagram where an RFID reader software communicates with an application software via a standard reader Application Programming Interfaces (API) according to prior art.

FIG. 5 is block diagram 501 of a prior architecture, where RFID reader 500 can communicate with application software 595, which is hosted externally in a PC/Server 590. RFID reader 500 includes standard reader engine 510.

Reader engine 510 communicates via a standard API 592 with application software 595. By standard API, it is meant native, or non-extended API.

Figure 6:
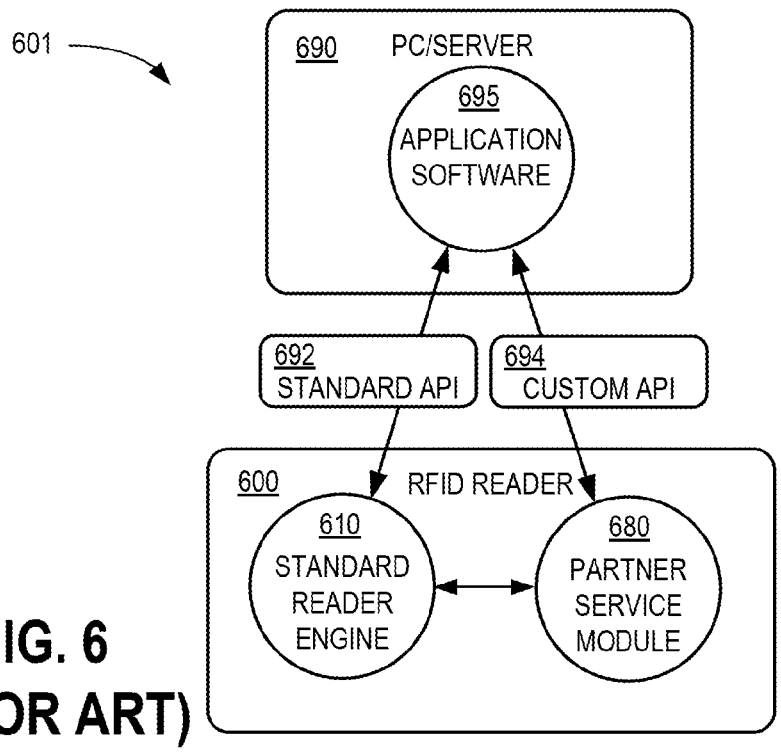
FIG. 6 is a block diagram where an RFID reader software communicates with an application software via a standard reader API, while a partner service module (PSM), hosted in an RFID reader, communicates with the application software via a custom API according to prior art.

FIG. 6 is block diagram 601, where RFID reader 600 hosts a PSM 680, and can communicate with application software 695, which is hosted externally in a PC/Server 690. In addition to PSM 680, RFID reader 600 includes standard reader engine 610.

Reader 600 communicates via two different channels with application software 695. Reader engine 610 communicates via standard API 692, while PSM communicates via custom reader API 694.

Figure 7A:
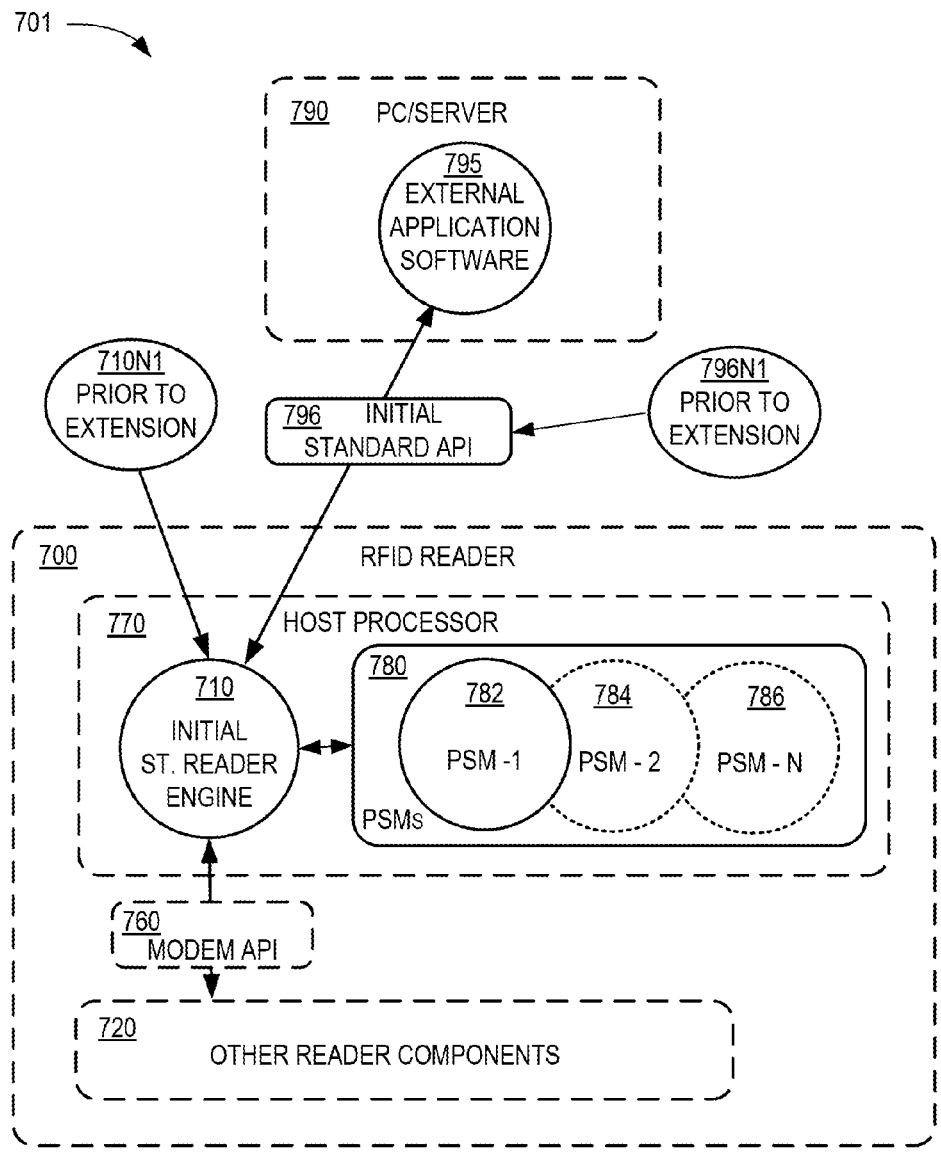
FIG. 7A is a block diagram of an extendable RFID reader software structure prior to extending an initial standard reader engine, according to embodiments.

FIG. 7A is a block diagram of RFID reader software structure 701 made according to embodiments. An RFID reader 700 is capable of communicating with external application software 795. RFID reader 700 includes a host processor 770. Host processor 770 includes an initial standard reader engine 710. One or more PSMs 780 are hosted in reader 700, typically in host processor 770.

Reader engine 710 is operationally coupled to PSMs 780, namely to PSM-1 782, and also to optional PSM-2 784, and PSM-N 786 if provided. Reader engine 710 communicates with external application software 795 via initial standard reader AP 796 and with other reader components 720 via modem API 760. External application software 795 may be hosted in PC/Server 790, or in RFID reader 700 itself.

Note 710N1 is meant to indicate that standard reader engine 710 has not been extended yet.

Figure 7B:
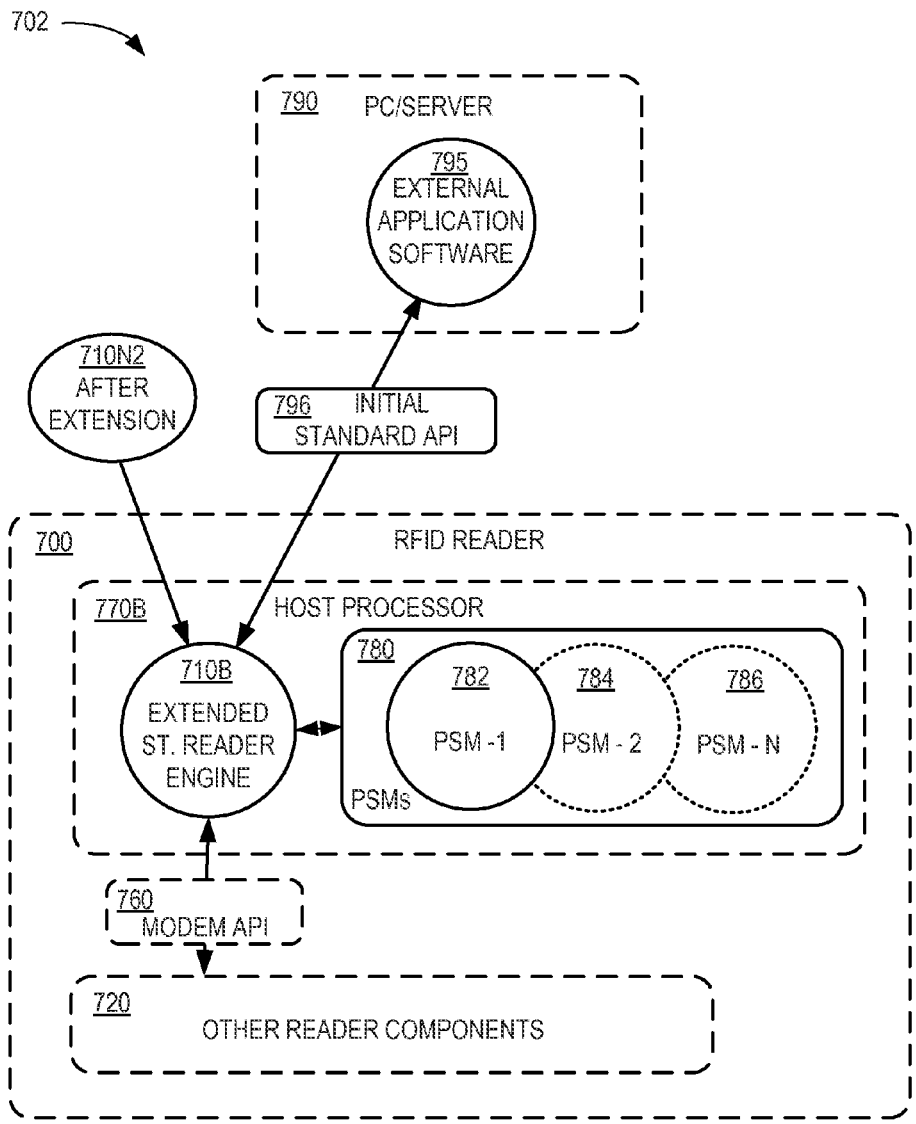
FIG. 7B is a block diagram like that of FIG. 7A, where further a reader engine has been extended, according to embodiments.

FIG. 7B is a block diagram of the RFID reader software structure 702, according to an embodiment. The difference between FIG. 7A and FIG. 7B, as indicated by note 710N2, is that initial standard reader engine 710 has now been extended, to become extended reader engine 710B based on information provided by PSMs 780. Extended reader engine 710B piggybacks custom protocol extensions on an existing connection.

Figure 7C:
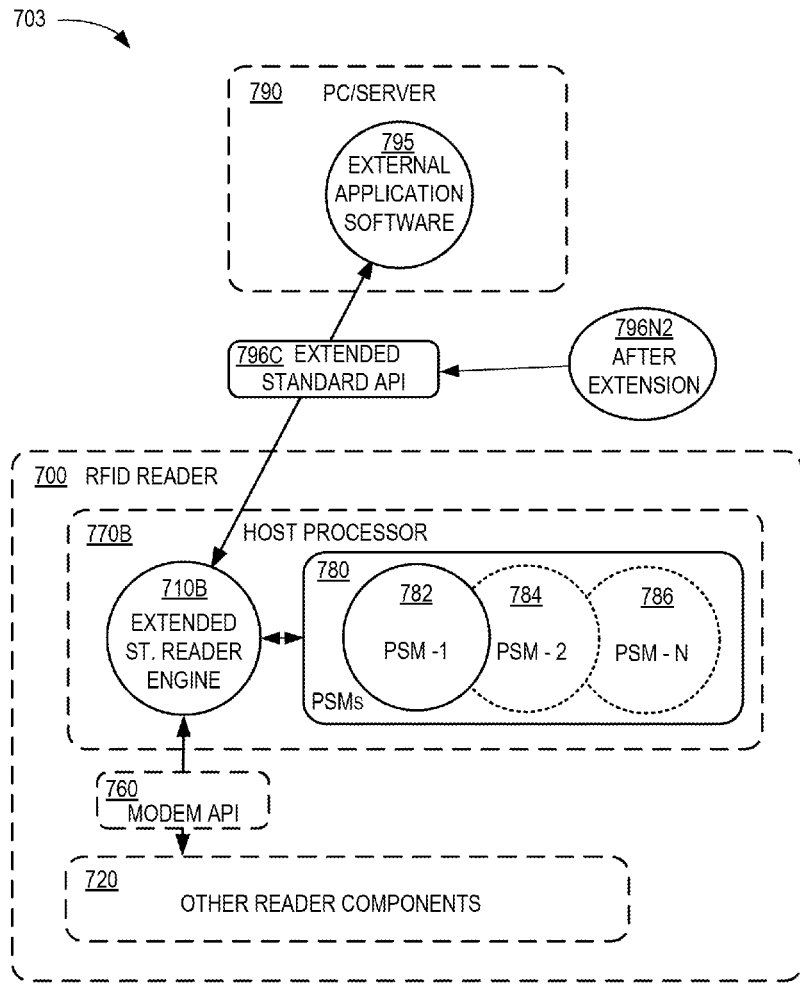
FIG. 7C is a block diagram like that of FIG. 7B, where further an initial standard API has been extended, according to embodiments.

FIG. 7C is a block diagram of the RFID reader software structure 703, according to an embodiment. The difference between FIG. 7B and FIG. 7C, as indicated by note 796N2, is that standard API 796 has been extended to become extended standard API 796C, based on information provided by PSMs 780. As such, extended standard API 796 is now capable of supporting PSMs 780.

Figure 8:
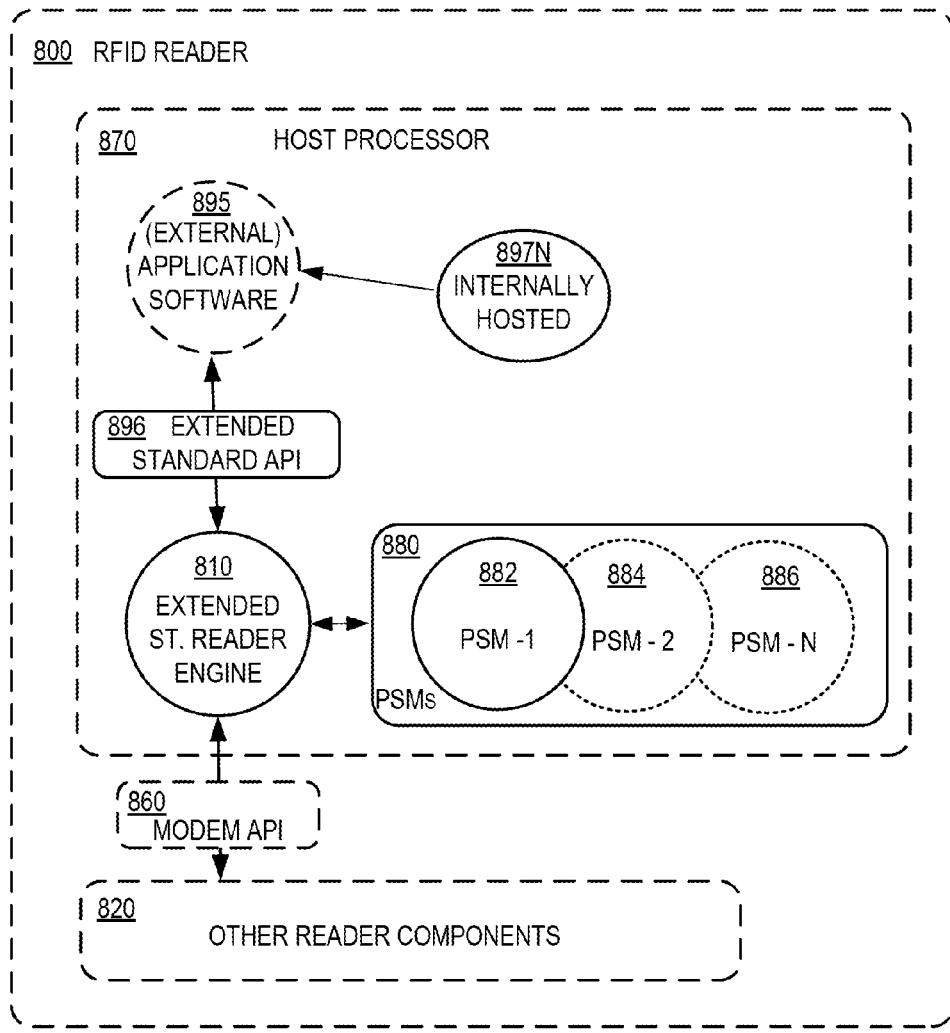
FIG. 8 is a block diagram of the RFID reader software structure with an extendable reader communicating with an application software via an extended standard reader API, according to embodiments.

FIG. 8 is a block diagram of an RFID reader software structure 800. The difference between FIG. 7C and FIG. 8, as indicated by note 897N, is that application software 895 is now hosted internally in RFID reader 800 rather than on PC/Server 790. That is why application software 895 need not be called always external application software.

Figure 9A:
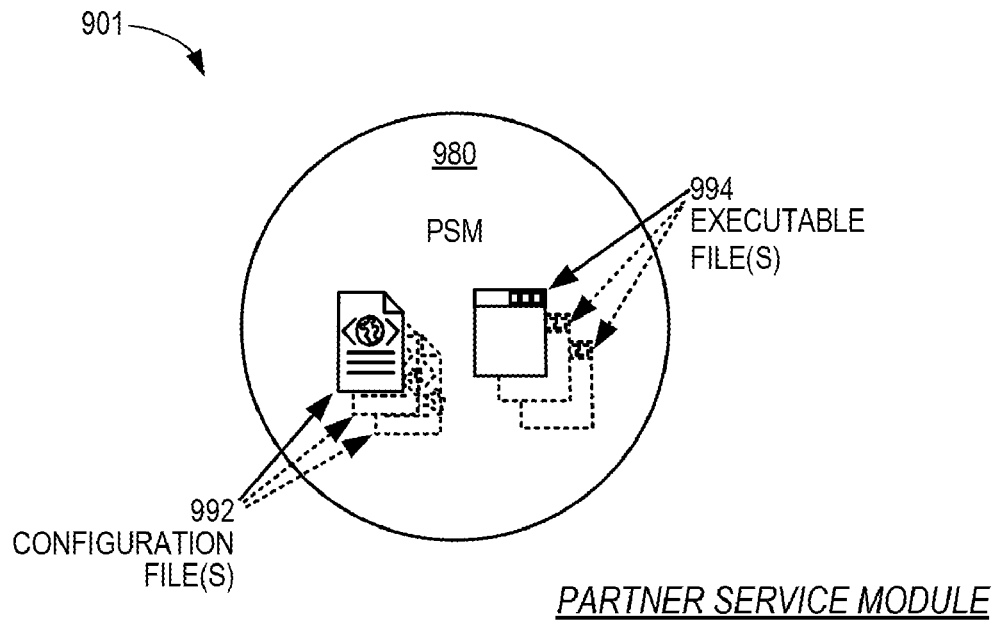
FIG. 9A is a simplified diagram illustrating sample contents of a PSM such as one of the PSMs of FIG. 7C or FIG. 8, according to embodiments.

FIG. 9A is simplified diagram 901, illustrating sample contents of PSMs 980, which can be similar to PSMs 780 or 880. PSMs 980 include one or more configuration files 992 and one or more executable files 994. One of the PSM configuration files 992 may include some or all of the following information. A PSM Identifier is a PEN of the partner authoring the PSM. A machine-readable protocol extension definition includes details of custom messages and parameters used to extend the standard API definition. It follows syntactic and semantic rules of the standard API being extended. A set of internal communication methods and addresses, e.g. loopback TCP connection, pipe, FIFO. Forwarding rules for messages, indicating what messages are deemed of interest to the PSM. These messages of interest may be native to the standard API, or may be custom messages defined within the configuration file. In addition information, that specifies the locations of executable files of the PSM.

One of the executable files 994 is generally developed by a partner. It can be used for extending the RFID reader embedded features and functions.

Figure 9B:
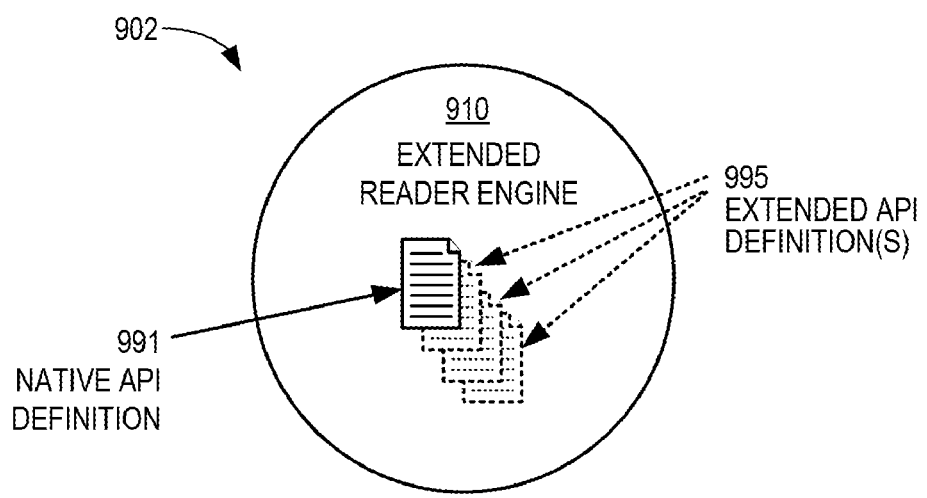
FIG. 9B is a simplified diagram illustrating sample contents of an extended reader engine such as the extended reader engine of FIG. 7C or FIG. 8, according to embodiments.

FIG. 9B is simplified diagram 902, illustrating sample contents of an extended reader engine 910, which can be similar to extended reader engine 710B or 810. Extended reader engine 910 includes a native API definition 991, and one or more extended API definitions 995 from PSMs 980. Extended API definitions allow extended reader engine 910 to convert initial standard API 796 to extended standard API 796C.

Figure 10:
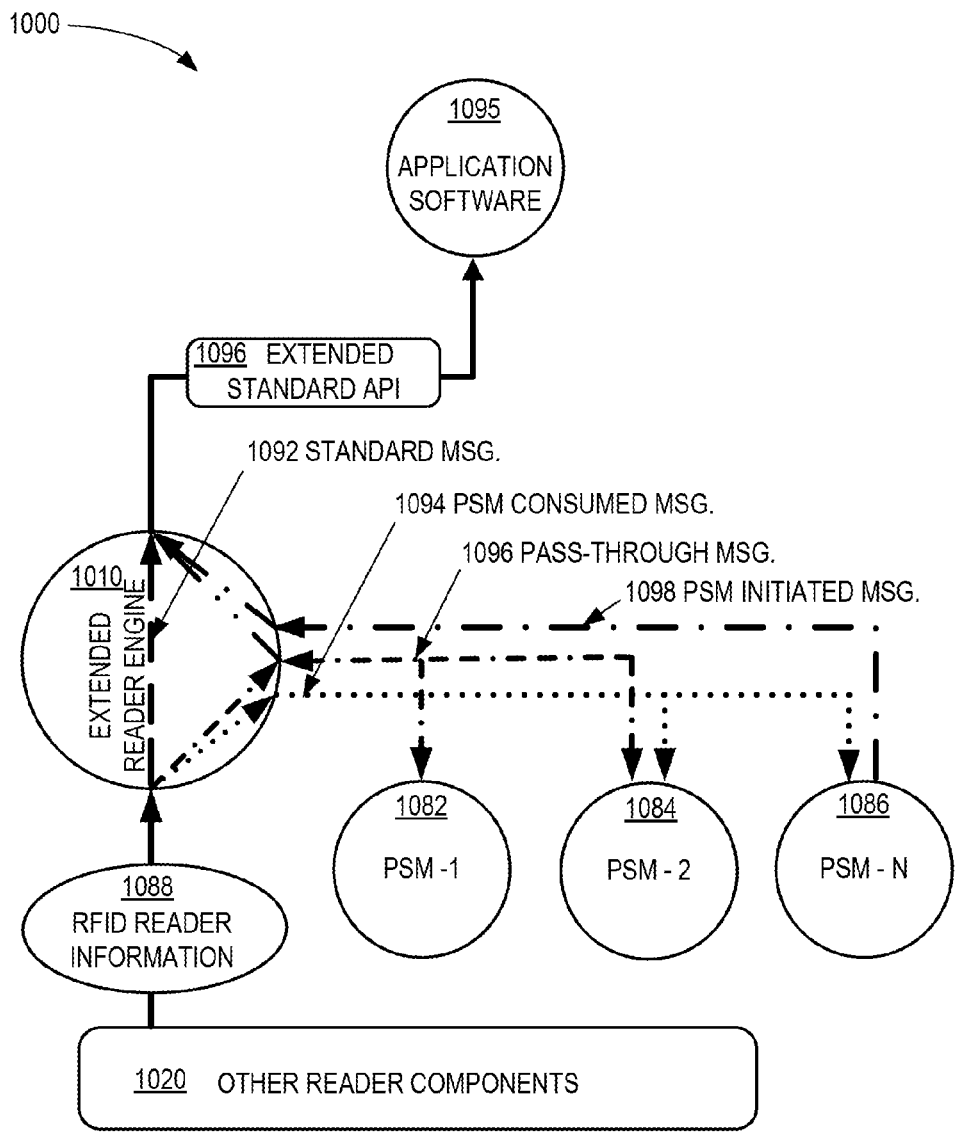
FIG. 10 is a simplified diagram for illustrating message routing in the scheme of FIG. 7C or FIG. 8, according to embodiments.

FIG. 10 is simplified diagram 1000 for illustrating a sample message routing schema for the scheme of FIG. 7C or FIG. 8 according to embodiments. Once a PSM is present and configured in an RFID reader, the functionality of a reader engine 1010 is extended, to provide means for routing messages to and from the PSMs, namely PSM-1, PSM-2, and PSM-N.

At least one of the PSFs (not shown) can communicate with external application 1095 via only extended standard API 1096, and not directly. In some embodiments, all the PSFs of one or all the PSMs can communicate with external application 1095 via only extended standard API 1096.

At least one of the PSFs can obtain RFID reader information 1088 from other reader components 1020. All messages are routed through extended reader engine 1010. Extended reader engine 1010 may duplicate messages, if multiple PSMs have been hosted, or of the messages are also to be provided to an external application.

A routing schema for messages can include upstream communication functionality and downstream communication functionality. Upstream communication functionality includes, for example, routing for standard messages 1092 from other reader components 1020 to application software 1095, routing for pass-through messages 1096, from PSM-1 1082 and PSM-2 1084 to application software 1095, and routing for PSM initiated messages 1098 from PSM-N 1086 to application software 1095. Downstream communication functionality includes the inverse of the above, in some embodiments.

Routing for PSM consumed messages 1094 is unidirectional from other reader components 1020 to PSM-1 1082, PSM-2 1083, and PSM-1 1082.

It should be noted that, in the absence of a PSM, only standard routing is utilized. Furthermore, routing messages for individual PSMs are controlled according to their own specific configuration files.

Figure 11:
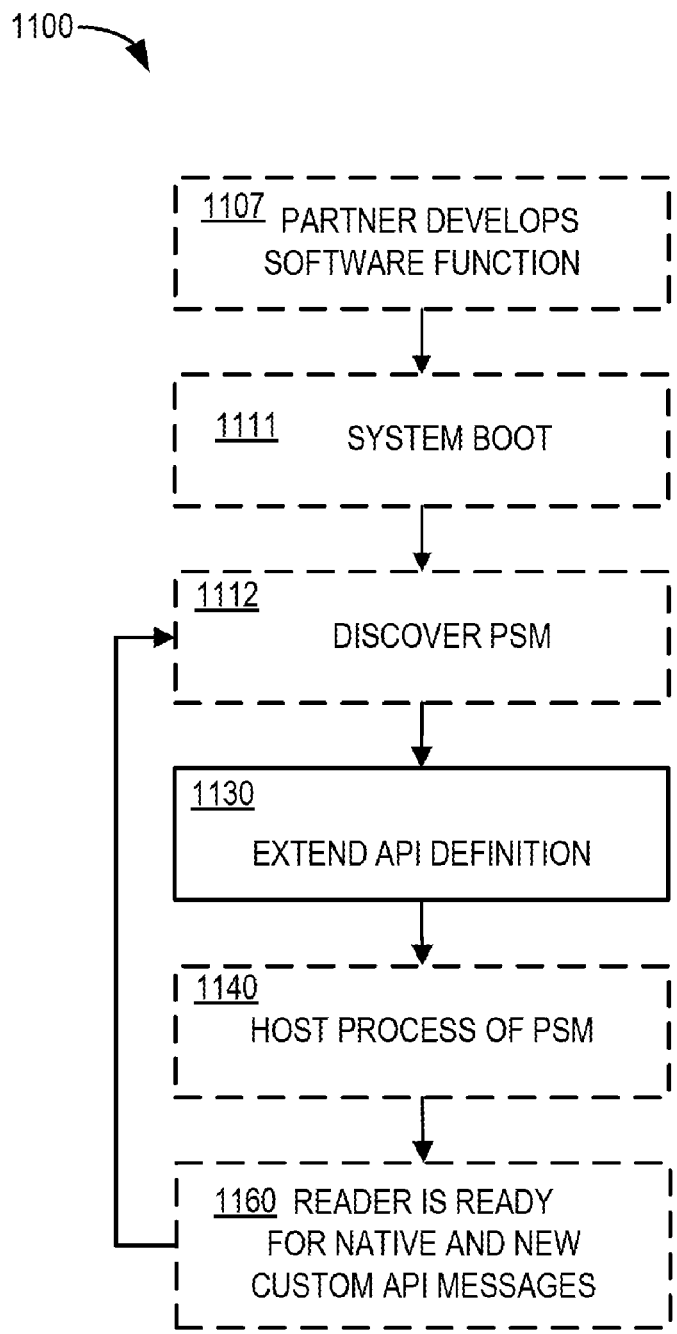
FIG. 11 is a flowchart illustrating a method for extending a reader's API functionality by auto discovery of the PSM, according to an embodiment.

FIG. 11 is a flowchart illustrating a method 1100 for extending a reader's API functionality by auto discovery of a PSM, according to an embodiment. The method of flowchart 1100 may be practiced by different embodiments, including but not limited to software described in this document. During this system configuration process, there is bidirectional communication between the extended reader engine and the PSM.

Method 1100 optionally starts at action 1107, when a partner develops a desired Partner Software Function (PSF) to operate on the reader. The implementing software module of a PSF, which is called a PSM, is then installed on the RFID reader.

After system boot 1111, in optional action 1112 attempting to discover a new PSM, the reader engine checks a well-known directory for the presence of a PSM in configuration files of PSMs.

In action 1130, a standard API definition is extended. Extending may be performed in any number of ways. Preferably, extending is made so as to reflect PSM requirements. One such way is described in more detail below.

In action 1140, a PSM process is hosted. In action 1160, the reader is operationally ready to handle standard, i.e. native, and custom API message types, with the extended standard API, over a single connection.

Figure 12:
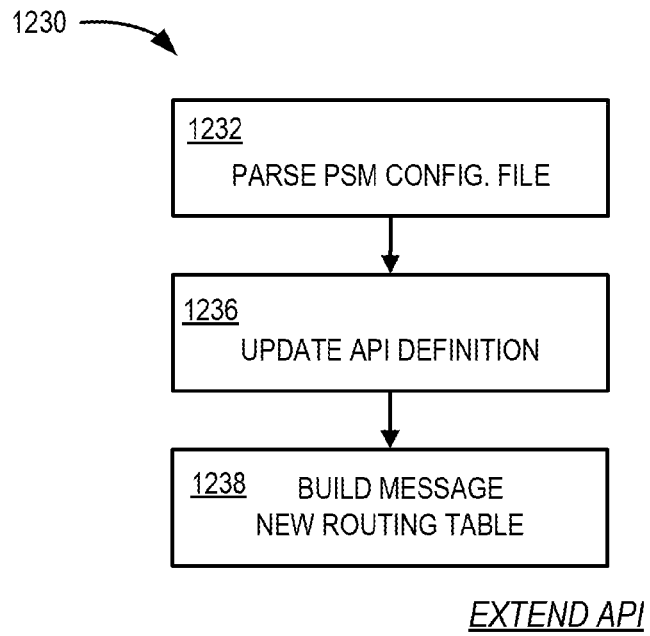
FIG. 12 is a flowchart illustrating a method for extending the API, according to an embodiment.

FIG. 12 is a flowchart illustrating a sample method 1230 for extending API definition 1130 of FIG. 11 by the reader engine, according to an embodiment. In action 1232, PSM's configuration file is parsed. In action 1236, the initial standard i.e. native reader API definition is dynamically updated to include custom features of the PSM. In action 1238, a new message routing table is built that controls how messages are routed.

Figure 13:
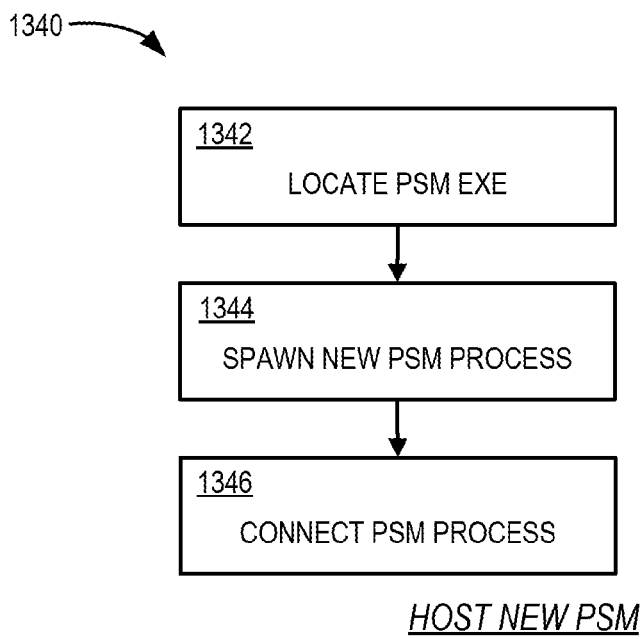
FIG. 13 is a flowchart illustrating a method for hosting the PSM, according to an embodiment.

FIG. 13 is a flowchart illustrating a method 1340 for hosting a PSM, as called for at action 1140 of FIG. 11, according to an embodiment. In action 1342, the PSM binaries, i.e.

executables, are located by the reader engine from information in the configuration files. In action 1344, PSM process is spawned by the reader engine. In action 1346, a PSM process is connected, which means that the communication channel has been established, and is available for use.

Figure 14:
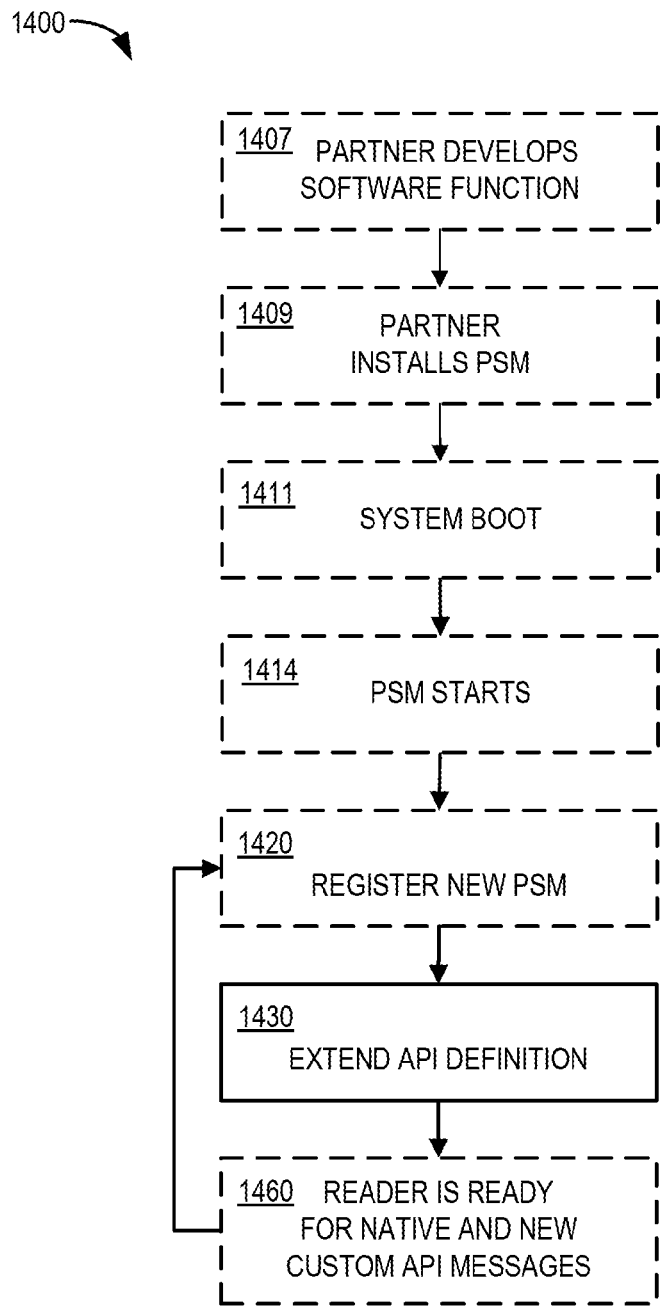
FIG. 14 is a flowchart illustrating a method for extending the reader API functionality by dynamic registration of the PSM, according to an embodiment.

FIG. 14 is a flowchart illustrating a method 1400 for modifying i.e. extending the reader API functionality by dynamic registration of the PSM, according to an embodiment. During this system configuration process, there is bidirectional communication between the extended reader engine and the PSM. Method 1400 optionally starts at action 1407, when a partner develops a desired Partner Software Function (PSF) to operate on the reader. In further optional action 1409, a PSM is installed by a partner, which is the implementing software module of a PSF.

After system boot 1411, in optional action 1414, PSM starts up, i.e. is spawned, independently of the reader engine. In optional action 1420, the PSM is registered. In action 1430, a standard API definition is extended, to reflect PSM requirements. In action 1460, the reader is operationally ready to handle standard, i.e. native, and custom API message types, with the extended standard API over a single connection.

Figure 15:
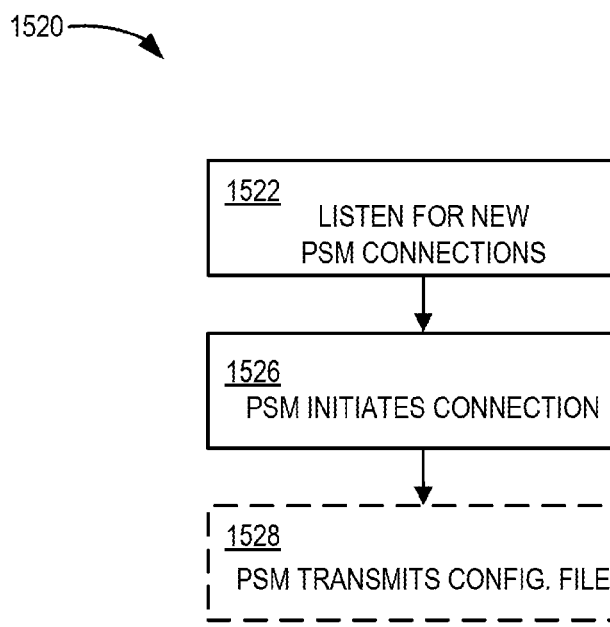
FIG. 15 is a flowchart illustrating a method for registering a new PSM, according to an embodiment.

FIG. 15 is a flowchart illustrating a method 1520 for registering a new PSM, as called for in action 1420 of FIG. 14, according to an embodiment. In action 1522, the reader engine listens via a well-known communication method for a new PSM connection. After listening to one, in action 1526, PSM initiates the connection to the reader engine. In action 1528, PSM transmits information contained in its configuration file.

Numerous details have been set forth in this description, which is to be taken as a whole, to provide a more thorough understanding of the invention. In other instances, well-known features have not been described in detail, so as not to obscure unnecessarily the invention.

The invention includes combinations and subcombinations of the various elements, features, functions, and/or properties disclosed herein. The following claims define certain combinations and subcombinations, which are regarded as novel and non-obvious. Additional claims for other combinations and subcombinations of features, functions, elements, and/or properties may be presented in this or a related document.

The invention claimed is:

1. A Radio Frequency Identification (RFID) reader communicating with an external application software, comprising:
a communication module configured to communicate with a server executing an external application software; and
a host processor configured to execute:
an extended reader engine in the host processor of the RFID reader communicating with the external application software via an extended standard Application Programming Interface (API), the extended reader engine further supporting a Partner Service Module (PSM) if one is present in the structure; and
in which if the PSM is present, a function of the PSM can communicate with the external application software only via the extended reader engine and the extended standard API.

2. The RFID reader of claim 1, in which
all functions of the PSM module can communicate with the external application software only via the extended reader engine and the extended standard API.

3. The RFID reader of claim 1, in which
supporting the PSM module includes modifying the extended standard API.

4. The RFID reader of claim 1, in which
the PSM is present and communicates with the external application software via the extended reader engine using the extended standard API.

5. The RFID reader of claim 4, in which
the PSM includes at least one configuration file and at least one executable file.

6. The RFID reader of claim 5, in which
the configuration file includes at least one of information of custom messages, a list of standard messages of interest to the PSM, and parameters used to extend an initial standard API so as to render it into the extended standard API.

7. The RFID reader of claim 4, in which
during a system configuration, there is bidirectional communication between the extended reader engine and the PSM.

8. The RFID reader of claim 4, in which
when the PSM consumes reader information there is unidirectional communication from the extended reader engine to the PSM.

9. The RFID reader of claim 4, in which
the PSM implements custom RFID reader functionality.

10. The RFID reader of claim 4, in which
the PSM resides on the host.

11. The RFID reader of claim 4, further comprising:
other reader components in communication with the extended reader engine, and
in which a function of the PSM can communicate with the other reader components only via the reader engine.

12. The RFID reader of claim 11, in which
all functions of the PSM module can communicate with the other reader components only via the extended reader engine.

13. The RFID reader of claim 11, in which
the PSM executes commands for controlling the other reader components.

14. A method for an RFID reader that includes an extended reader engine, and a standard Application Programming Interface (API), comprising:
extending a functionality of the standard API to generate an extended standard API, per a requirement of a partner service module (PSM) that can be supported by the extended reader engine, such that a function of the PSM can communicate with an external application software only via the extended reader engine and via the extended standard API.

15. The method of claim 14, in which
all functions of the PSM module can communicate with the external application software only via the extended reader engine and the extended standard API.

16. The method of claim 14, further comprising:
extending an initial reader engine of the RFID reader to derive the extended reader engine.

17. The method of claim 16, in which
extending the initial reader engine includes updating an API definition of the reader engine.

18. The method of claim 14, in which
the functionality is extended by the extended reader engine.

19. The method of claim 14, further comprising:
discovering a presence of the PSM.

20. The method of claim 19, in which
the standard API is extended with a PSM API,
where the PSM API has a syntax same as a syntax of the standard API.

21. The method of claim 19, in which
extending the functionality includes parsing a configuration file of the discovered PSM.

22. The method of claim 21, in which
extending the functionality includes building a new message routing table based on rules provided by the configuration file.

23. The method of claim 22, in which
the routing table defines messages that are to be rerouted to the discovered PSM.

24. The method of claim 22, in which
all message routings per the routing table are via the extended reader engine.

25. The method of claim 19, further comprising:
hosting a process of the discovered PSM on the reader.

26. The method of claim 25, in which
hosting includes locating an executable file of the discovered PSM.

27. The method of claim 25, in which
hosting includes spawning a new PSM process from the discovered PSM.

28. The method of claim 25, in which
hosting includes connecting the PSM process to the extended reader engine.

29. The method of claim 14, further comprising:
installing the PSM on the RFID reader; and
registering the PSM with an initial reader engine of the RFID reader to derive the extended reader engine.

30. The method of claim 29, in which
registering includes listening via a well-known communication method for a new connection from the PSM.

31. The method of claim 29, in which
registering includes spawning a PSM process independently of the initial reader engine.

32. The method of claim 29, in which
registering includes initiating a connection by the PSM to the initial reader engine.

33. The method of claim 29, in which
registering includes transmitting to the initial reader engine information contained in a configuration file of the PSM.

* * * * *